United States Patent Office 3,297,786
Patented Jan. 10, 1967

3,297,786
METHOD OF GRAFT POLYMERIZING ONTO HYDROPHOBIC SUBSTRATES
Carl Horowitz, Brooklyn, N.Y., assignor to Yardney International Corporation, New York, N.Y., a corporation of New York
No Drawing. Filed July 22, 1963, Ser. No. 296,487
2 Claims. (Cl. 260—857)

My present invention relates to the graft polymerization of polymerizable hydrophilic materials onto normally hydrophobic substrates and, more particularly, the treatment of high-molecular-weight polymeric materials, especially nylons, to augment their wettability, to increase their wicking properties and, in general, to improve their characteristics so as to render them increasingly useful. This application is a continuation-in-part of applications Ser. No. 142,513, now abandoned, and Ser. No. 175,316, now abandoned, filed Oct. 3, 1961 and Feb. 23, 1962, respectively, and of application Ser. No. 204,629, now abandoned, filed June 22, 1962.

It has long been a desire in the polymer art to improve the wettability of such normally hydrophobic synthetic resins as nylon by graft polymerization of certain synthetic resins having hydrophilic characteristics onto a "backbone" of the hydrophobic resin. Not long after the advent of nylon, Graves, in U.S. Patent No. 2,238,694, disclosed that it was possible to alter the surface characteristics of polyamides, such as nylon, by coating filaments thereof with a polymeric liquid and permitting this liquid to harden. Frequently, the polymeric coating cracked, stretched or was otherwise deformed with respect to the nylon substrate to yield surface modifications which may or may not have been desirable. Subsequently, Smith, in U.S. Patent No. 2,343,095, described a process for treating nylon and cellulosic fibers within synthetic resins such as alkyde resins, phenol-formaldehyde resins and ethylenically or vinylically unsaturated compounds, wherein these resins could be attached to nylon fibers by preparing a dispersion of the polymer using cationic surface-active agents as emulsifiers and applying the dispersion to the backbone fibers, the polymeric substrate being substantially unbonded to the applied synthetic resin which was polymerized in situ. Other attempts along these lines, as typified, for example, by U.S. Patents Nos. 2,406,412 and 2,406,453, involved the vapor deposition of vinylically unsaturated monomers upon a cellulosic fiber (e.g. wool) and the treatment of this substrate with a polymerization catalyst to promote polymerization of the vinylidyne compound on and within the fibers. U.S. Patent No. 2,406,453 attempted to extend this principle to linear polyamide fibers such as nylon. This vapor deposition was not, however, found to produce a graft between the linear polyamide and the vinylically unsaturated compound.

The failure of these earlier attempts to provide proper bonding of vinylic compounds to hydrophobic materials such as nylon led many researchers to believe that the only way such graft polymerization could effectively be carried out was to activate selected sites in the backbone polymer so as to render them susceptible to polymeric linking with the vinylic substance. Earlier, however, Latham and Morton disclosed, in U.S. Patent No. 2,468,086, that it was ostensibly possible to improve the adherence of acrylic compounds and other vinylic unsaturates to hydrophobic materials which, like the acrylic material, were generally anionic and, therefore, repelled the anionic coating materials, by providing a cationic coupling agent and treating the backbone polymer with this agent prior to or concurrently with application of the vinylic substance. The latter was then homopolymerized on the nylon backbone. In 1951, Landells and Whewell, in an article entitled "Preparation and Properties of Regenerated Cellulose Containing Vinyl Polymers" (September 1951 issue of the Journal of the Society of Dyers and Colourists, vol. 67), described attempts to form high-molecular-weight compounds inside textile fibers and, especially, cellulosic fibers. In this attempt to apply liquid-carrier techniques to the deposition of vinylic polymers on cellulose as an advance over earlier processes employing vapor-phase depositions, Landells and Whewell impregnated the cellulosic material in a solution of a ferrous salt, dried it and then refluxed it in an aqueous solution containing a vinylic monomer and hydrogen peroxide. Presumably, these efforts were required in order to ensure attachment of the vinylic polymer to the cellulosic substrate. Subsequently, British Patent No. 818,412, issued July 5, 1955, demonstrated the importance of modifying attachment sites on the backbone material and emphasized that, in accordance with techniques prevalent in the art, it was essential that a backbone material, especially one of highly hydrophobic character, undergo modification at the potential attachment site prior to any graft formation. In accordance with this British patent and subsequently issued U.S. Patent No. 3,083,118, modification of the attachment site was carried out by affixing an ion-exchange substance, capable of reacting with a catalyst or serving as a catalyst for the homopolymerization of the vinylic substance, to the backbone material and thereafter treating the backbone with the vinylic monomer to effect graft polymerization. There was not the least hint at that time that graft polymerization of vinylic substances to nylon-like hydrophobic substrates could be carried out without such modification of the potential attachment sites.

While modification of the backbone material to provide suitable attachment sites as mentioned above was not in itself disadvantageous, the ion-exchange bonding of catalyst substances to the backbone at these sites frequently resulted in a discoloration of the backbone material, particularly if the catalyst or ion-exchange linking agent contained a strongly colored ion, such as the ferrous or ceric ion. Presumably to eliminate this discoloration, Tanner, in U.S. Patent 2,999,056, described a method for bonding acidic compounds to polymeric structures by subjecting the backbone material, in the presence of a vinylic compound, to ionizing electromagnetic radiation. This technique was particularly suitable for use with polyamides such as nylon. Urchick, in U.S. Patent No. 3,008,920, correctly points out that the use of high-energy ionizing radiation to prepare graft polymers is characterized by excessive homopolymerization with relatively little inter- or graft polymerization, the homopolymer frequently being insoluble and difficult to separate from the graft-copolymer product. To solve this problem, Urchick made use of a cupric oxychloride catalyst but required other means, i.e., ionizing radiation, to provide active centers or free-radical sources in the starting polymer chain. The use of high-energy ionizing radiation is, however, inconvenient per se as a consequence of the expensive equipment required for carrying out ionization activation of the polymer. Stanton et al. (U.S. Patent No. 3,049,508) also emphasize, as a well-accepted concept in the art, the importance of free-radical sites on a hydrophobic or nonreducing backbone for the graft of vinylic compounds thereto.

In parallel developments, Mino and Kaizerman (U.S. Patent No. 2,922,768), as well as other workers in the field demonstrated that polymerizable monomers can be graft polymerized in the presence of a ceric salt and a polymeric organic reducing agent which is capable of initiating homopolymerization of the monomer in accordance with these techniques, the polymeric reducing agent can also serve as a backbone onto which the polymerizable monomer can be grafted In the Mino et al. process, however, the resulting product is an interpolymer of a prepolymerized backbone and a vinylic compound, the prepolymerized material serving as the organic reducing agent. For this process to be effective, it is absolutely essential that the backbone polymer constitute an organic reducing agent. In this patent this backbone is one of a host of polymeric substrates known to have reducing characteristics. Similarly, Coover (U.S. Patent No. 2,921,044) describes a process wherein vinylic compounds formed inter- or terpolymers with amides which were polymerized in situ.

From the foregoing review of the state of the art it can be observed that, as far as graft polymerization onto relatively nonreducing and hydrophobic substrates such as polyamides is concerned, it is the teaching of the prior art that the grafting of vinylic and allylic compounds to hydrophobic substrates requires site activation preparatorily to the linking of the vinylic compound to the hydrophobic material; that the nonsensitizing grafting of vinylic compounds to substrates requires a backbone having strongly reducing character and capable of being oxidized by the catalyst; and that polymerization catalysts having oxidizing characteristics can only be used for the interpolymerization of two synthetic resins when at least one of them has strong reducing properties.

It is the principal object of the present invention, therefore, to extend the principles of the above-identified copending applications Ser. Nos. 142,513, 175,316 and 204,629 to provide a process for the graft polymerization of vinylically unsaturated substances upon normally hydrophobic and relatively nonreducing backbones or substrates without the need for high-energy electromagnetic radiation, ion-exchange modification of the substrate or similar techniques used hitherto to prepare sites to receive the grafts.

It is another object of the present invention to provide a treatment for high-molecular-weight synthetic or naturally occurring polymeric materials to improve the wettability, handling, wicking properties and the like.

It is a further object of the present invention to provide treating agents suitable for effecting the above-mentioned objects.

It is still another object of this invention to provide high-molecular-weight polymeric material of improved properties and usefulness.

It is an additional object of the present invention to provide a practical commercial textile application for the attachment to hydrophobic fabrics and filaments (particularly of nylon) of treating agents which improve the character of the textile material.

It is also an object of this invention to provide a textile material (e.g. filament, yarn, fiber, fibril, woven or nonwoven fabric) with improved properties.

It is another object of this invention to treat a hydrophobic and/or electrostatic polymeric material, particularly in the form of a textile material (e.g. filament, fiber, fibril, yarn, woven or nonwoven fabric) for the purpose of rendering it readily wettable and antistatic etc. and to provide products resulting from such a process.

The present invention is based upon the discovery that, the weight of the art to the contrary, it is possible to graft vinylically unsaturated monomers or partial polymers onto highly hydrophobic totally polymerized backbones, especially nylons, without the aid of special site activation or methods leading to catalyst discoloration of the final product when a particular class of catalyst and certain operating conditions, specified hereunder, are employed. Prior to a more detailed explanation of the invention, it should be noted that the treatments to be described are best carried out with the class of polymeric materials generally designated as "nylons." This term, as used herein, designates the fully polymerized synthetic resins produced in accordance with and described in U.S. Patents Nos. 2,071,250, 2,071,253 and 2,130,948. Such compounds are synthetic linear condensation polymers principally obtained by the condensation polymerization of amino acids or diamines with dicarboxylic acids. Among the nylons with which the present process is especially operable are nylon 6, a synthetic resin produced by polycondensation of caprolactam; nylon 66, a linear polymer obtained by the condensation of hexamethylene diamine with adipic acid; and nylon 610, a polymeric material formed by condensation of hexamethylene diamine with sebacic acid. The term thus designates polyhexamethylene and polydecamethylene as well as homologues thereof.

Surprisingly, it has been discovered, according to one aspect of the instant invention, that polymerizable monomeric compounds and, especially, ethylenically unsaturated monomers can be grafted onto nonreducing or substantially nonreducing polymeric backbones in the presence of a class of catalysts among which the most effective are certain cerium-containing compounds.

In another aspect of this invention, it has been found that certain catalysts, described in more detail below, are suitable for grafting polymerizable monomeric materials onto polymeric organic reducing as well as non-reducing (or only limitedly reducing) polymeric substrates. This is unexpected, particularly in light of the fact that prior-art catalysts were considered operative only in connection with organic reducing agents and not suitable for use with nonreducing materials or polymeric materials having limited ability to reduce oxidizing agents.

A variety of nonreducing or substantially nonreducing organic polymers are known in the art and can be employed in accordance with the invention. These include the polyamides mentioned above, polyvinyls, polyvinyl/polyacrylic copolymers, polyalkylenes (e.g. polyethylene, polypropylene), polyesters, etc. These materials are characteristically hydrophobic and have a tendency to be collectors of static electrical charge. These properties can be modified by graft polymerization as will be more readily apparent hereinafter.

Of particular interest as catalysts for graft polymerization of ethylenically unsaturated monomers onto nylons and like backbones without special modification of the attachment sites are the metal salts (organic or inorganic), oxides or hydroxides of the rare-earth elements and the metals of the actinium series as well as the corresponding iron and copper compounds. Exceptional results were obtained with the cerium compounds, e.g. salts, oxides or hydroxides, and particularly the water-soluble salts. By way of illustration, the following may be mentioned: ceric nitrate, ceric sulfate, ceric chloride, ceric acetate, ceric ammonium nitrate, ceric ammonium sulfate, ceric ammonium pyrophosphate, ceric iodate, ceric naphtenate, ceric linoleate, cupric nitrate, cupric sulfate, cupric chloride, cupric acetate, ferric nitrate, ferric sulfate, ferric chloride, ferric acetate, and ferric ammonium sulfate, in acid solution preferably below pH 3. The special class of catalysts, hereinafter referred to as the acid-complex catalysts and described in greater detail below, may also be used to advantage. It may be noted, however that not all rare earths and actinide compounds produce identical results. For example, terbium, holmium, praseodymium, lanthanum, neodymium and dysprosium yield better results than europium, gadolinium, thorium, erbium and samarium compounds.

According to another feature of the present invention, catalysts suitable for the graft polymerization of vinylic compounds to substrates of the type envisioned in U.S. Patent No. 2,922,768 as well as the hydrophobic polymers (especially nylons) mentioned above are best adapted for the treatment process. This catalyst is preferably a metal salt of a rare-earth or actinide element complexed with an acid. It may be more particularly described by the formula:

$$(M^m)_a(A^a)_m \cdot H_aA \qquad (1)$$

wherein M is a rare-earth (lanthanide) metal or a metal of the actinium series; $m$ is the valence of metal N; A is an acid radical, preferably of a mineral acid and $a$ is the valence of the acid radical A. By way of illustration, the metal M of Formula 1 may be a cerium-earth metal such as La, Ce, Pr, Nd, Il, Sa; a terbium-earth metal such as Gd, Tb; or a ytterbium-earth metal such as Dy, Ho, Er, Tm, Y, Yb, Sc, Lu; as well as Ac and Th. The acid radical A in Formula 1 above may be any of a variety of inorganic or organic acid radicals. These ordinarily will be mineral acid radicals such as sulfuric, nitric, hydrochloric, phosphoric, etc. However, they may also be radicals of organic acids, e.g. acetic, propionic, butyric, naphtenic, etc.

Although the broad class of compounds defined by Formula 1 have catalytic activity, it has been discovered that those described by the general formula:

$$M(SO_4)_2 \cdot H_2SO_4 \qquad (2)$$

wherein M is a tetravalent metal from the group consisting of the rare-earth elements and elements of the actinium series, are of particularly great utility.

Although applicant does not want to be bound by any theory as to the mechanism involved in the catalytic activity or actual structure of the catalyst, it is believed that the catalysts exist in solution in the form of the sulfate/metal acid or as partial hydrolysis products thereof. With regard to cerium catalysts, the following structural formulas may be hypothesized:

$$H_2[Ce(SO_4)_3] \quad \text{or} \quad H_2[Ce(SO_4)_3 \cdot (H_2O)_3]$$

the partial hydrolysis product may be described by the formula:

$$H[Ce(OH)SO_4]$$

The polymeric, high-molecular-weight materials which can be treated with the aid of a catalyst of Formula 1, in accordance with the present invention, include synthetic condensation polymers, synthetic addition polymers, natural cellulosic polymers, modified cellulosic polymers, polyisoprene polymers, naturally occurring polyamides and the like. These polymeric materials may take any of a variety of shapes or forms. Thus, for example, they may be used in the form of powder, flakes or, preferably, as shaped or formed objects, e.g. rods, strips, tubes, sheets, bars, films, bristles, etc. However, this invention has a particular advantage in the treatment of fibers, yarns, tows, filaments, and fabrics made therefrom such as woven and nonwoven, knitted, fiber-matted or laminated fabrics.

Among the synthetic condensation polymers which may be advantageously employed in this aspect of the present invention may be mentioned polyureas, polyurethanes, polyesters, polyethers, epoxy resins and polysulfonamides, in addition to the nylon-type polyamides. Included in the many synthetic addition polymeric materials which are useful in this invention are those prepared from such polymerizable monomers (by homo-, inter- or terpolymerization) as acrylic esters; vinyl chloride, vinyl alcohol, vinyl fluoride, vinylidene chloride, vinyl acetate, the vinyl ketones, vinyl ethers and divinyl ethers; halogen-, sulfur-, nitrogen- and phosphorous-containing vinyls; vinyl silanes; polyenes such as ethylene, tetrafluoroethylene and propylene; allyl esters, acrylonitrile and methacrylonitrile; and elastomeric substrates derived from 1,3-butadiene, isoprenes, chloroprenes and 2,3-dimethyl-1,3-butadiene.

Although the principles of the present invention can be applied to many synthetic resins in a variety of forms, a dominant feature of the instant invention resides in the treatment of synthetic textile materials, which exhibit hydrophobic properties and/or electrostatic retention, such as the synthetic fibers, filaments, fibrils, yarns, woven and nonwoven fabrics of polyamide, polyvinyl, copolymeric polyvinylpolyacrylic, polyacrylics, polyethylene, polypropylene or polyester resins with an acid-complex catalyst as described. One type fabric of particular commercial importance which is eminently suitable for treatment in accordance with the present invention are fabrics which are elastic and stretchable only in one direction. This property is imparted to the fabric through a special knitting process or through the knitting of textured yarns with straight yarns. By way of example, fabrics sold on the market as "tricot" fabrics may be mentioned. Nylon "tricot" fabrics are prepared by means of a special knitting process wherein the yarn knitted in one direction is looped around and interknitted with yarn knitted in another direction. This supplies excess yarn in one direction which makes it possible to stretch the knitted fabric in that direction. These materials, when treated in accordance with the present invention, are rendered more wettable and susceptible to dyeing treatments. Similarly, naturally occurring polymers, particularly fiber- or filament-forming polymers, may also be used as base materials in accordance with this aspect of the present invention. They include the natural cellulosic and polyamide (proteinic) polymers as well as chemically modified products of this character. Among these materials may be mentioned: cotton, flax, jute, silk, wool, fur, hair, leather, wood, regenerated cellulose, cellulose acetate, cellulose triacetate, cellulose butyrate, cellulose propionate, cellulose butyrate-propionate, casein, alginates, zein, etc.

An important feature of this invention is that the present treatment increases the wicking action of a fabric, i.e. its ability to draw liquids by capillarity along the fabric, and thus improves the clothing value of the fabric. Moreover, it is possible, by controlling the treatment parameters, to regulate the ability of the treated fabric to absorb moisture from the atmosphere (moisture regain) and thus permit the fabric to dissipate absorbed perspiration by evaporation. Other important beneficial properties imparted to these materials are, in addition to improved and long-lasting wettability, antistatic and antisoiling abilities, increased tear strength, antiwrinkle property, decrease in chlorine retention, increase in tensile strength, and improved dyeability. The treating agent may also be modified to introduce adjuvants which further impart other desirable properties to the materials, e.g. flame-proof the fabric. Furthermore, there may also be introduced into the treating agent of this invention bactericidal agents which will impart to the finished product a fungicidal and/or bactericidal character. Silver-containing compounds have been found to be particularly suitable for this purpose. Among these may be mentioned: silver polyvinylpyrrolidone compounds, silver salts of partially depolymerized alginic acids, silver salts of higher fatty acids such as hexanoic, caprylic, undecylic, etc.; such compounds are described in commonly assigned U.S. Patents Nos. 3,082,193 and 3,087,774, by way of example.

As mentioned above, a component of the present treating solution is a polymerizable monomer of the vinylically or ethylenically unsaturated type. Of special interest are polymerizable monomers containing a polymerizable reactive group with the structural configuration $-CH\!=\!C\!<$. Where the primary interest is the treatment of a polymeric material having hydrophobic, electrostatic and/or high soiling characteristics for the purpose of reducing or eliminating them, it is preferred to utilize a polymerizable ethylenically unsaturated compound having a single functional group capable of ionic dissociation to form positive and negative ions, e.g. a functional group immediately adjacent a carbon atom having an ethylenic bend. Such polymerizable ethylenically unsaturated compounds may be described more particularly by the general formula:

$$\overset{H}{\underset{|}{R-C}}=\overset{R^1}{\underset{|}{C-X}} \qquad (3)$$

wherein $R^1$ is a radical selected from the group consisting of hydrogen and alkyl; R is a radical selected from the group consisting of hydrogen, alkyl, hydroxyalkyl (such as hydroxymethyl or hydroxyethyl), aryl (such as monocarbocyclic aryl—i.e. phenyl, tolyl or xylyl), and aralkyl (such as monocarbocyclic aralkyl—i.e. benzyl or p-methylbenzyl—); and X is a functional group capable of ionic dissociation. In cases wherein R or R¹ are alkyl or hydroxyalkyl, the alkyl portion may contain up to 30 carbon atoms but should rarely exceed 18 carbon atoms. Where R is aryl or aralkyl, its substituents should be such as not to interfere (i.e., sterically or chemically) with the attachment of the ethylenically unsaturated compound to the base polymer. Exceptionally good results have been obtained with compounds wherein R and R¹ are selected from the class consisting of hydrogen or lower alkyls such as methyl, ethyl, propyl, butyl, pentyl, and hexyl alkyl. In this case X represents a functional group of one of the following types: a carboxyl group or salt thereof (alkali-metal, alkaline-earth-metal, or rare-earth-metal salt, e.g. a Na, Ka, Ca, Ba, Mg, or Ce salt;

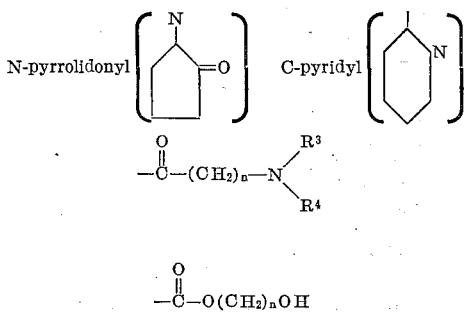

or

where $n$ is a number from 1 to 8 and $R^3$ and $R^4$ are lower-alkyl radicals such as methyl or ethyl radicals. In the case wherein X is a nitrogen-containing radical, the ethylenically unsaturated compound may be used in the form of its amine salt (e.g. hydrochloride) or quaternary-ammonium compound. The quaternary-ammonium compounds may be formed from an alkyl halide (e.g. methyl iodide, methyl bromide, ethyl chloride, ethyl bromide or propyl chloride) or from an aralkyl compound (e.g. benzyl iodide or chloride).

As used herein, the term "ionizable functional group" is intended to include those functional groups which form ions by reaction with water in aqueous solution. Thus, for example, it includes the secondary amines of the general formula:

$$CH_2=CH-N\overset{R}{\underset{H}{|}}  \quad (4)$$

which, in aqueous solution, may be considered to exist as:

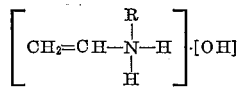

the latter ionizing to yield:

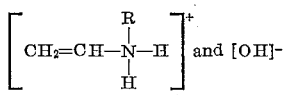

It has been found that the wettability of the graft-polymer materials produced in accordance with the instant invention may be made more resistant to washing by incorporation of a polybasic-acid compound in the treating agent. Surprisingly, I have discovered that, for a given quantity of polymerizable monomer, it is possible to increase the wettability of the material treated by adding the polybasic-acid compound to the treating solution. A large variety of acids or their anhydrides (herein collectively referred to as acid compounds), may be used effectively. These compounds may be aliphatic or aromatic; it is preferred, however, that the organic-acid compound be an aliphatic, dibasic compound, saturated or unsaturated, and particularly a nonhydroxylated dibasic acid compound of this character. By way of example, the following polybasic compounds may be used as additives to the treating solution: maleic anhydride, maleic acid, fumaric acid, succinic anhydride, succinic acid, adipic acid, glutaric acid, sebacic acid, malonic acid, pimelic acid, suberic acid, aconitic acid, phthalic acid, phthalic anhydride, ethylmalonic acid, benzylmalonic acid, methylmaleic acid, manaconic acid and itaconic acid. The treating agent is preferably an aqueous solution, suspension or dispersion, although it may also comprise a solution, suspension or dispersion wherein the solvent system is such that a part or all of the water is replaced by an organic solvent. Oxygenated organic solvents, e.g. alcohols, ketones, aldehydes and esters, are suitable for this purpose. Furthermore, certain hydrocarbon solvents which are inert to the polymerization reaction may also be employed; among these may be mentioned benzene, toluene, xylene, naphthalene, Varsol #1, Varsol #2, mineral spirits, P–1 ink oil, P–2 ink oil, deodorized petroleum solvent No. 590, deodorized petroleum solvent No. 470, No. 80 white oil (U.S. Patent No. 2,590,655), heptane, octane, kerosene and the like.

While the pH of the treating solution employed may vary widely, e.g. from somewhat less than 1 to 7, depending on the material which is to be treated and the particular results sought, it is preferred, especially when nylon polyamides are treated, to use a pH well on the acid side (i.e. below pH 3). The acid solutions may be prepared by adding strong mineral acids, preferably nitric acid or sulfuric acid, to the treating composition. In some cases, although mineral acid is added to the treating solution, it may be buffered with a conventional buffering agent, e.g. sodium bicarbonate or sodium acetate, to a pH of about 4.5. It is important, when the material treated is a fabric which may be degraded in strong acid solutions, to work at pH values of 4 and above. The quantity of active materials (e.g. ethylenically unsaturated compound, metal ion or compound or acid) can be varied in accordance with the results desired. The extent to which the desirable characteristics, e.g. wettability or antistatic properties, are imparted to the backbone material is determined primarily by the quantity of active material present in the treating agent. In general, however, it is advantageous to employ the polymerizable monomer, e.g. the ethylenically unsaturated compound in a range from 0.1 to 50 parts by weight per 100 parts by weight of treating solution, preferably from 0.5 to 40 parts by weight per 100 parts by weight of treating solution. The quantity of metal compound employed as a catalyst in the treating solution will also vary with the amount of ethylenically unsaturated compound used. The preferred range is 0.01 to 5% by weight of metal compound based on the treating solution. The acid content may likewise vary, the best results being obtained in the range from about 0.1% to 10%, based on the weight of treating solution used.

A particularly practical method for treating nylons without a pretreatment with ionizing radiation or ion-exchange coupling agents, which takes into consideration the cost of materials and the performance of the treated material, entails the use of an aqueous treating bath containing from 0.1 to 20% by weight of acrylic acid and from 0.01 to 5% by weight of a saturated solution of technical ceric sulfate containing 44% total sulfate (expressed as $SO_3$) with a structural formula represented as $Ce(SO_4)_2 \cdot H_2SO_4$. This is quite suitable for the treatment of nylon-66 woven fabric. In a similar method, which employs maleic anhydride as well as acrylic acid, the anhydride and the acrylic acid are present in the treating solution in a range from 0.1 to 2.5% by weight. The maleic anhydride, preferably, is present in a quantity in excess of, and up to three times greater than, the amount of acrylic acid. In carrying out the process of the present invention, particularly when the polymeric backbone is in the form of fibers, filaments, films or fabrics, the base material is saturated with the treating solution and excess liquid squeezed out of the material. The final product may be described in terms of the quantity of treating agent remaining affixed to the product after completion of the process. In general, this will vary between 0.1 and 2.5%, based on the weight of the polymeric material. Effective and economical treatment of the fabric, e.g. nylon-66 woven material, results in a weight gain of 2% by the fabric in the course of the treatment. The treatment may be effected at any suitable temperature depending on the speed of reaction and character of the product desired; preferably, the treatment is carried out at room temperature, although temperatures from about room temperature (say 20° C.) up to the boiling point of the treating solution may be employed.

The duration of the treatment will also vary considerably depending on the other conditions employed, e.g. temperature, concentrations, etc. In general, however, a treatment time within the range of one to 60 minutes will be most satisfactory. Exceptionally good results have been obtained with treatment times of about fifteen minutes; rapid treatments, wherein the dwell time in the treating agent is of very short duration, are also possible. The grafting may be effected under ambient conditions or in an inert atmosphere, i.e. in the absence of oxygen or air, the latter being preferred. Furthermore, the present method can be carried out either as a one-step or as a two-step process. A single solution containing all of the active ingredients may, for instance, be prepared and the material passed therethrough. In another mode of operation, the material may first be treated with one solution containing principally the ethylenically unsaturated compound or another polymerizable monomer, and then with a further solution containing the metal compound. This order may also be reversed, in which event the material will first be treated with a solution containing the metal compound and then the solution containing the ethylenically unsaturated compound. This demonstrates that it is not essential that the hydrophobic backbone be first treated so as to permit ion-exchange attachment of the catalyst prior to application of the vinylic compound. Moreover, no specific modification of the attachment site need be effected in advance of contact of the vinylic monomer with the backbone, there nevertheless being no interruption of the polyamide chain or a weakening thereof by this treatment.

It has been found that the present treating agent may be applied prior to any treatment required subsequently and that it can be combined with the conventional treating agent in a single bath. Thus, for example, it has been found that the treating agent improves the manner in which certain normally hydrophobic fabrics take up dyes. In this case, the treating agent may be applied prior to the dyeing operation or be incorporated in the dyeing bath to be applied simultaneously with the dye. With fabrics such as nylon it is customary, after the dyeing operation, to subject the material to a "dye-fixing" operation which represents a separate step in the processing of the material. It has been found that by incorporation of the present treatment agent in the dye bath the need for a "dye-fixing" stage is eliminated. This is of particular importance in the finishing of hosiery and is believed to be due to the fact that the dye adheres strongly to the graft-modified surface of the previously hydrophobic backbone material.

In the use of this treatment with yarn, fibers, fabric, etc. it has been found beneficial to add a textile-softening agent to the treating bath in order to improve the "hand" of the product. The most suitable agents are those of the nonionic type. Of particular importance in this regard is "Emersoft 7700 Special," a product of Emery Industries Inc., Cincinnati, Ohio, this product being a fatty-acid derivative. Other materials of interest are fatty amides of the type described in U.S. Patent No. 2,764,601, polyethyleneglycol fatty-acid esters and polyethylene glycols having molecular weights from 200 to 6,000. The "hand" of the material treated may be controlled in accordance with this invention by varying the temperature of treatment, the concentrations of the treating agent, the additives employed, etc. This feature of the invention is further described in examples given hereafter.

According to another feature of the instant invention, the long-term effectiveness of the graft, as evidenced by residual wettability even after multiple washings, is increased by including in the treating bath an alkali-metal salt or an alkaline-earth metal salt and, particularly, inorganic-acid salts of this nature. Optimum results were obtained with baths containing sodium sulfate. Nylon fabric treated in this fashion withstood ten washings at 60° C. in neutral soap solution and the wettability was still good. Furthermore, when this material was dyed with an Acid-Red dyestuff, a much lighter shade, although with greater uniformity, was obtained as compared with similarly dyed nylon which had been treated with a solution which did not contain this salt.

Preferably, after the treating agent is applied to the polymeric material (e.g. nylon-66 woven fabric), the material is dried by quick application of heat thereto. This may be effected with a hot iron or by passing the material over heated drums. In general, it is advantageous to dry the treated material for a period on the order of 60 to 180 seconds at a temperature of about 94 to 140° C. The optimum conditions are a time range from 90 to 130 seconds and a temperature range from 106 to 120° C.

Although I do not wish to be limited by any theory or mechanism of operation of my invention, the evidence on hand appears to indicate that the process of the present invention produces novel chemical products in which the ethylenically unsaturated compound, containing a single ionizable functional group, is graft polymerized to a backbone of the high-molecular-weight polymeric base. The metal compounds described above are thought to catalyze this reaction. The improved wettability, antistatic properties, etc. imparted to the treated hydrophobic substrate appear to be dependent partly on the nature of the ionizable functional group attached to the polymerized ethylenically unsaturated graft material and on the number of such groups contained in the final product. One method of determining the number of ionizable functional groups contained in the product is to convert these groups to carboxyl groups and then to measure the equivalent number of titratable-acid groups per $10^6$ grams of polymer. When the ionizable functional group is a carboxyl group, the determination obviously may be made directly. It has been found that the maximum wettability as well as maximum improved dyeing properties require limitation of the number of functional groups, expressed as titratable-acid groups, to a range of 125 to about 190 equivalents of titratable acid per $10^6$ grams of polymer. The preferred range is from about 150 to 190 equivalents of titratable acid per $10^6$ grams of polymer. It should be noted that, although the range of equivalent titratable acid mentioned above is a measure of the carboxyl content (or ionizable-functional-group content) of the final product, it is also a measure of the number of monomeric units which have been grafted onto the polymeric backbone if the polymerizable monomers each have a single ionizable functional group. The number of functional groups and monomeric units incorporated in the product is important for obstensible steric considerations.

A problem encountered in the repeated washing of fabrics, e.g., nylon fabrics, in modern detergents is the retention by the fabric of chlorine from bleaches. Chlorine retention in nylon fabrics manifests itself in a yellowing of the fabric upon repeated washing and ironing, the yellowing increasing in intensity with an increase in the number of detergent washings to which the fabric has been subjected. Surprisingly, nylon fabrics which have been subjected to treatment in accordance with the present invention do not become yellow on repeated washings with detergents. The best results with regard to elimination of chlorine discoloration are obtained when the treatment is carried out at about the boiling point of the treating solution as described in more detail below. It is believed that grafting under these circumstances masks those sites on the polymeric material which might otherwise retain the chloride. The nylons most suitable in this connection are nylon 66 (molecular weight between 8,000 and 50,000); nylon 610 (molecular weight 20,000 to 50,000); nylon 6; polyamide 11 (autocondensation product of 11-aminoundecanoic acid); and other low-molecular-weight nylons (2,000 to 10,000).

The following examples are further illustrative of the present invention. Unless otherwise specified, "parts" in the various portions of this specification refer to parts by weight. For the purposes of the examples, the expression "nylon-66 fabric," unless otherwise specified, refers to a taffeta fabric woven from 70-denier-polyhexamethylene-adipamide-continuous-filament yarn having a denier per filament of 2.0. The polyamide is produced from hexamethylenediamide and adipic acid and has a relative viscosity (as defined in U.S. Patent No. 2,385,890) of 37, 39 equivalents of —$NH_2$ ends and 92 equivalents of —COOH ends per $10^6$ grams of polymer. The polymer is prepared using 0.34 mol percent acetic-acid stabilizer (which ends are, of course, not titratable), equivalent to 15 amine ends. From these data, following the method of G. B. Taylor and J. E. Walts ("Analytical Chemistry," vol. 19, p. 448; 1942), the molecular weight (number average) is calculated to be about 13,700. The beneficial properties imparted to the polymeric materials as described hereunder make them eminently useful in many industries. One application that comes to mind is the use of thse polymeric materials in their fabric, fiber, filament or yarn forms to fabricate wearing apparel, e.g., socks, dresses, etc. All of the improved properties mentioned above are useful in this domain. In other areas of usefulness one property will be more important than the other. Thus, treated nylons in the form of fabrics or films may be used as separator or interseparator materials in batteries. Semipermeable separators of this character of improved wettability are particularly useful as separators or interseparators in alkaline silver-zinc or silver-cadmium batteries (see, for example, U.S. Patents Nos. 2,594,709; 3,013,099; 3,013,100; 2,905,738; 2,816,154 and 2,635,127).

In the following examples reference will be made to a "Standard Treating Solution." Unless otherwise specified, this solution is prepared as follows:

STANDARD TREATING SOLUTION

It is made by first compounding solution A by the admixture of:

Acrylicacid (glacial), cc. _____ 110
Water, cc. _____ 190
Tergitol #4 [$C_4H_9CH(C_2H_5)$
 $C_2H_4CH(SO_4Na)CH_2CH(CH_3)_2$], g. _____ 1 and then compounding solution B by dissolving

Technical ceric sulfate, g. _____ 10.5 containing 44% sulfate (as $SO_3$), which apparently has the structural formula (in solution):

$$H_2[Ce(So_4)_3] \quad (5)$$

in 300 cc. of water.

Solutions A and B are mixed together to form about 600 cc. of the Standard Treating Solution. Furthermore, unless otherwise specified, the term "solution" refers to aqueous solution.

*Example 1*

A first solution was prepared by admixing:

Acrylic acid, g. _____ 50 and

Water, cc. _____ 250 and a second solution by mixing together $Ce(SO_4)_2·H_2SO_4$ (structural Formula
 5 in solution), g. _____ 70
Concentrated nitric acid (70%), g. _____ 50
Water, cc. _____ 2,000

All of the first solution was mixed with 50 cc. of the second solution to form a treating solution. A sample of nylon 66 (average molecular weight 12,000 to 14,000) fabric was immersed in this solution for 15 minutes at room temperature. The sample was taken out, washed with warm water and dried. Even after several washings with "Ivory" soap in a commercial washing machine at 60° C. the nylon sample still exhibited excellent wettability.

*Example 2*

The procedure of Example 1 was followed, except that in place of acrylic acid an equal quantity of methacrylic acid was used. Similar wettability characteristics were imparted to the nylon fabric.

*Example 3*

A monomer solution was prepared by mixing:

Acrylic acid, g. _____ 150
Distilled water, cc. _____ 250 and

Ceric solution, cc. (see below) _____ 150
Ceric solution:
 $Ce(SO_4)_2·H_2SO_4$ (as per Formula 5), g. ____ 70
 Concentrated nitric acid, g. _____ 90
 Distilled water, cc. _____ 2,000

A sample of nylon 66 fabric was immersed in the monomer solution and maintained therein for one hour at room temperature. It was then taken out, washed with warm water and dried. When a drop of water was placed upon a tightly stretched sample of the treated nylon it was absorbed in 65 to 80 seconds. A drop of water placed on nontreated nylon fabric remained unabsorbed until it dried up. Both samples were washed five times in a commercial washing machine, using "Ivory" soap. The samples were again stretched and a drop of water placed on each of them. The treated sample absorbed the water in 85 seconds. The nontreated sample did not absorb the water at all. In a variant of this example, methacrylic acid was used in place of acrylic acid with similar results.

*Example 4*

The treated sample of Example 3 was soaked for ten minutes in a 5% solution of sodium metabisulfite to remove a slight yellow tint resulting from residual quantities of complex and ceric ion. The wettability of the sample so treated remained the same, thereby demonstrating that the ceric ion plays little role as a coupling agent in ion-exchange relationship with the substrate.

*Example 5*

A treating solution was prepared by admixing:

Acrylic acid (Rohm & Haas), g. _____ 100
Water, cc. _____ 100
Ceric solution, g. (see below) _____ 200
Ceric solution:
 $Ce(SO_4)_2·H_2SO_4$ (as Formula 5
  in solution), g. _____ 7
 Concentrated nitric acid, g. _____ 18
 Water, cc. _____ 200

A sample of woven nylon 66 (average molecular weight 12,000 to 14,000) fabric was immersed in the treating solution immediately upon addition of the ceric solution to the acrylic acid. After one hour at room temperature, the nylon fabric was taken out and washed in a copious quantity of warm water. The dry sample exhibited excellent wettability characteristics, as indicated by the quick absorption of a drop of water (i.e. in less than one minute). The treated sample of nylon was then washed ten times in a commercial washing machine, using "Ivory" soap. After drying, the wettability of the sample remained unchanged; that is, a drop of water thereon disappeared in less than one minute. The complex ceric ion imparted a slight yellow color to the fabric, which can be removed as set forth in Example 4. In place of the acrylic acid, hydroxyethyl methacrylate was used in this system with results similar to those obtained with acrylic acid.

*Example 6*

A solution was prepared containing:

Water, cc. --------------------------------- 360
Hydroxyethyl methacrylate, g. ------------------ 120
Ammonium persulfate, g. ----------------------- 1.2

A sample of woven nylon 66 (average molecular weight 12,000 to 14,000) fabric was placed into this solution. It was kept there for one hour at a temperature of 60° C. The result was a permanently wettable nylon as per Example 5, except that there was no discoloration.

*Example 7*

A solution was prepared containing:

Water, cc. --------------------------------- 360
Hydroxyethyl methacrylate, g. ------------------ 120
Ferrous sulfate solution (0.3 g. per 200 cc. of solution), mil ------------------------------ 1
Ammonium persulfate, g. ----------------------- 2½
Sodium metabisulfate, g. ----------------------- 2½
Tertiary butyl hydroperoxide, drops ------------ 2

A sample of woven nylon 610 (average molecular weight 20,000 to 50,000) fabric was immersed in this solution for ten minutes at room temperature. The sample was then taken out and washed in warm water. A permanently wettable nylon was obtained as per Example 5.

In all these examples a monomer was grafted onto the nylon. In the case of acrylic-acid and methacrylic-acid graft as per Examples 1 to 5, a polymer graft is formed, rich in polycarboxyl groups. In Examples 6 and 7, a polyhydroxyethyl methacrylate graft is formed, rich in polyhydroxyl groups. In all these graft polymers, the ionizable groups attract water molecules from the surroundings, holding them by electrostatic force. Thus, a permanently wettable, antistatic nylon fabric is produced.

The treatment of the polyamide with the ethylenically unsaturated monomer or other polymerizable monomer in accordance with the process of the present invention is thought to result in a change in the chemical structure of the basic polyamide fiber or textile due to true graft polymerization. The structure will, of course, vary depending on the particular polyamide employed and the ethylenically unsaturated monomer grafted thereon. Where the polyamide is of the type formed by the condensation of a dibasic acid and a diamine, it is believed that the graft-polymerization product has a structure which may be expressed as follows:

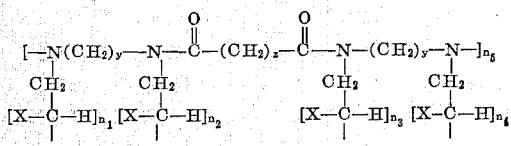

wherein $y$ and $z$ are integers whose ranges are from about 2 through 14; $n_1$, $n_2$, $n_3$, $n_4$ are the degrees of polymerization of the grafted ethylenically unsaturated monomer at the respective graft sites; $n_5$ is the degree of polymerization (repetition number) of the backbone and X is the ionizable functional group as defined above. In the above formula, $n_1$ to $n_4$ are generally on the order of 2 to 1,000. The basic polymeric chains onto which the vinylic compounds are grafted have an average molecular weight of 8,000 to 50,000.

The fact that a graft polymer has been formed from the ethylenically unsaturated monomer rather than a mere coating of a polymer thereof is made apparent from a consideration of the known solubility characteristics of the simple polymeric compounds and the wettability of the finished product. It is known, for example, that polyacrylic acid is water-soluble and would be readily washed out of nylon fabric if it were merely present as a deposit on the fabric. It is also known that the untreated nylon fabrics are hydrophobic and are not readily wettable. As noted above, even after repeated washing of the treated nylon products of this invention, when a drop of water is placed on the dried product, the water rapidly diffuses and disappears. This clearly establishes that the original nylon has been altered and that the ethylenically unsaturated monomer is chemically bonded to the polyamide.

*Example 8*

A first solution was prepared containing:

Acrylic acid (glacial), g. ---------------------- 110
Methylethyl hydroquinone as a polymerization inhibitor, p.p.m. ------------------------------ 200
Distilled water, cc. --------------------------- 190
Tergitol #4 (7-ethyl-2-methyl-4-undecanol sodium sulfate), g. --------------------------------- 4

A second solution was also prepared containing:

Ce(SO$_4$)$_2$·H$_2$SO$_4$ (structural Formula 5 in solution), g. ------------------------------------ 105
Water, cc. ---------------------------------- 300
Concentrated nitric acid, g. -------------------- 5

The two solutions were mixed together to form the treating solution.

A sample of nylon 66 fabric, previously scoured and boiled for one-half hour in a soap solution to remove greases etc., was wetted to saturation with the treating solution. The sample was removed and the excess liquid was squeezed out of the sample to such an extent that liquid equal to between 35 and 100%, by weight, remained behind. The fabric so treated was wrapped in a polyethylene bag, to exclude the air therefrom, and stored for five days in the absence of air and at room temperature. The nylon fabric was then washed and dried. After two washings with "Ivory" soap, the nylon fabric wetted quickly. A drop of water placed on a stretched sample of the material disappeared in 105 seconds. A similar drop of water placed on a stretched untreated sample disappeared after five minutes.

*Example 9*

The procedure of Example 8 was repeated, except that the storage step in the polyethylene bag was carried out for 15 minutes at 70° C. After washing and drying, the sample was washed twice in a commercial washing machine. This sample absorbed a drop of water in 70 seconds.

*Example 10*

Three samples of nylon 66 fabric were soaked to saturation in 5%, 10% and 25% solutions of acrylic acid, respectively. The samples so treated were then wrapped in aluminum foil and sent to the Brookhaven National Laboratories where they were subjected to one million REP's of gamma radiation. The samples were then rinsed with water in order to remove excess acrylic acid, and washed. A determination was made of the carboxyl content of the respective samples. The results are tabulated below, together with the results of an untreated sample of nylon and the results of typical samples obtained in accordance with the procedures outlined in the previous examples:

TABLE I

| Sample | Concentrated Acrylic Acid, percent | Carboxyl Equiv. $10^6$ grams Nylon |
|---|---|---|
| 1 | 5 | 341 |
| 2 | 10 | 370 |
| 3 | 25 | 386 |
| Untreated Nylon Control | | 89.5 |
| Typical Samples Obtained by Examples 1–10 above | | 162 to 183 |

Samples 1, 2 and 3 as well as the control showed poor wettability, this being in only one direction of weave. After two commercial washings, Samples 1, 2, 3 became completely hydrophobic and water-repellent. In contrast, the nylon products prepared in accordance with this invention were easily wetted in all directions and this wettability was retained after numerous washings.

This example demonstrates that the present method results in a chemical bond between graft and backbone which is much less prone to rupture than bonds obtainable with the aid of ionizing reduction. The importance of a limited number of carboxyl groups in the end product was also amply demonstrated by these experiments.

*Example 11*

Polyethylene glycol (600) acrylate was prepared in accordance with prior-art processes. A sample of nylon 66 fabric was scoured and immersed to saturation in a 200-cc. aqueous solution of the above ester containing 5 g. of ammonium persulfate catalyst. The immersed sample was maintained in a water bath for one hour at 80° C. The nylon sample so treated was washed with "Ivory" soap and water. This sample, together with a control and a typical sample of the same nylon treated with an aqueous solution of acrylic acid containing nitric acid and $Ce(SO_4)_2 \cdot H_2SO_4$ (structural Formula 5 in solution) in accordance with the present invention, was tested for wettability. The test involved again placing a drop of water on the stretched surface of the fabric and measuring the time it takes for the light reflection in the drop to disappear. The results of this test are tabulated below:

TABLE II

Sample: Time in seconds
(1) Nylon treated with polyethylene (600) acrylate ___ 370
(2) Nylon treated in accordance with the present invention _____ 25
(3) Nylon control _____ 1,140

Thus, although there is some improvement in the wettability of (Sample 1), the results obtained by the present process (Sample 2) were about twelve times better.

*Example 12*

Five rolls of fabric were prepared for treatment. Each roll consisted of approximately 50 yards of nylon-66 sheer blouse fabric, 50 yards of a lightweight nylon-66 taffeta, 1 yard of a Dacron (polyethylene terephthalate, described in Matthews' "Textile Fibers," 6th edition, pp. 1024–1031), and cotton blended fabric, ½ yard of polypropylene fabric (made from monofilaments of the normally solid homopolymer of propylene) and ½ yard of 100% filament Dacron fabric, all sewn end to end. Each of the five rolls was treated as follows:

(1) The first roll was padded in the above-described "Standard Treating Solution" at a temperature of 30° C. Approximately 35% of liquid was left in the fabric after the padding operation. The goods were allowed to stand 24 hours in this condition and were then neutralized with sodium bicarbonate and finally scoured in a neutral soap solution. This was followed by a washing and the conventional drying operation. This roll was designated "Sample 1."

(2) A 50% solution of the "Standard Treating Solution" was formed by the addition thereto of an equal volume of water. The second of the predescribed rolls was treated on a jig by passing it through said 50% solution for 30 minutes at a temperature of about 50° C. This was followed by washing, neutralizing, neutral-soap scouring, washing and drying. This roll was designated "Sample 2."

(3) The third treating solution was prepared by mixing 25% by volume of the "Standard Treating Solution" with 75% water; a third roll was immersed in the solution for 45 minutes at a temperature of 65° C. This was followed by washing, neutralizing with sodium bicarbonate, neutral-soap scouring, washing and drying. The roll was designated "Sample 3."

(4) A fourth treating solution was obtained by mixing 12½% by volume of the "Standard Treating Solution" with 87½% by volume of water. A fourth roll was passed through this solution for a period of 45 minutes at a temperature of 87° C. Thereafter, the goods were washed, neutralized with sodium bicarbonate, washed in a neutral soap solution, washed again and then dried. The roll was designated "Sample 4."

(5) *Control.*—The remaining fifth roll was given a conventional detergent scouring to remove size, manufacturing grease and the like. It was then washed and dried without any further treatment whatsoever. The roll was designated "the Control."

*Results.*—Wettability Test—Samples of fabric 8 inches square were taken from all five rolls and subject to a wettability test which was conducted by holding the sample in a stretched position over the top of a cup and permitting drops of water to fall onto the fabric. Visual observations were made as to the rate of uptake of the moisture in terms of spreading over the surface of the fabric and/or disappearance in a downward direction. As a result of these tests, it was evident that Samples 1 and 2 provided the best initial wettability, similar to wettability characteristics obtained in laboratory testing. Samples 3 and 4 showed a lower degree of wettability, although still with substantial improvement over the Control.

Static electricity is a big problem in the handling of fabrics such as nylon on the manufacturing level. It is also one of the chief drawbacks to the use of nylon in intimate wear which, together with the poor moisture pickup, renders garments clammy in the summer and cold in the winter. In commercial-scale operations carried out in accordance with Example 12, involving the rapid movement of the materials over rollers, there was a marked reduction in static electricity in the material treated in accordance with this invention. This result persisted even after the treated material was scoured. During ordinary handling of nylon fabric in finishing plants the static electricity can be very markedly felt by an operator near the machine. With nylon treated according to the present invention, however, no static electricity was felt to any significant extent.

As mentioned previously, the treating agent according to the present invention improves the dyeing characteristics of polymeric materials particularly in the form of fibers, filaments or fabrics. In the case of nylon treated in accordance with this invention, the rate of dyeing with anionic dyestuffs is slower than normal. As a result of this, the streaking usually noticed in dyeing nylon with anionic dyes is greatly reduced. On the other hand, the cationic dyestuffs, which normally have only a slight affinity for nylon, can be applied to treated nylon to provide full color tones. Cellulose triacetate reacts similarly to nylon with cationic dyestuffs when treated in accordance with the present invention.

Example 13

Nylon Samples 1 to 5, as described in Example 12, were dyed by using an acidic dyestuff (i.e. Alizarin Cyanin Green—C.I. 61570) to the extent of 1% based on the weight of the fabric. A 40:1 liquor ratio was employed as well as 2% by weight, based on the fabric, of acetic acid. It was observed that the control sample of nylon dyed considerably more rapidly than any one of the samples treated in accordance with the present invention. Samples 3 and 4 showed the slowest rate of exhaustion. As mentioned before, this is a desirable feature since it may be used to control the streakiness inherent in dyeing nylon with acid-type dyestuffs.

A similar dyeing procedure was employed to dye the samples of nylon Nos. 1 to 5 of the previous example with a cationic dyestuff (Sevron Orange G—C.I. 48035). There was an unexpectedly high dye yield from all of the samples treated according to the present invention when compared with the control.

Example 14

Nylon half-hose is a particular area wherein the improved wettability and moisture absorption are great assets in the comfort of the sock. The procedure described hereafter was followed to impart these properties to the socks:

Two pairs of commercially obtained nylon-66 half-hose were treated in a 6% solution of the "Standard Treating Solution" described above at a temperature of 86° C. for 30 minutes. This was followed by washing, neutralizing with sodium bicarbonate and scouring in a neutral soap solution at a temperature of 60° C. It was found that the hose so treated wetted out readily with drops of water released from an eyedropper within the course of 5 to 15 seconds whereas untreated half-hose remained impervious to water after as long as two minutes exposure to the droplet.

The implication of this in terms of body comfort is obvious: such wettability involves the wicking away of moisture from any given surface and, for the customarily large area of the fabric, produces an increased rate of drying.

Example 15

This example further illustrates the application of the process of the present invention to acrylic fibers.

A 6% solution of the "Standard Treating Solution" was made up. Ten grams of Creslan acrylic fiber containing 88% acrylonitrile and 12% methyl vinyl pyridine (also known as X–51 Acrylic Fiber and described on pp. 1011–1018 of Matthews' "Textile Fibers," sixth edition), in the form of carpet material was treated at a temperature of 85° C. for a period of 30 minutes; the carpet was then washed, neutralized in sodium bicarbonate and scoured. Good dyeing characteristics were observable.

Example 16

Two solutions were prepared. The first one, designated monomer solution, was made by diluting part A of the "Standard Treating Solution" in 7 parts by volume of water. The second solution, designated as sulfate solution, was made by diluting part B of the "Standard Treating Solution" in 7 parts by volume of water.

A nylon-66 woven-fabric sample was first immersed to saturation in the monomeric solution, squeezed to remove the excess liquid and then immersed in the sulfate solution, whereupon the fabric was again squeezed to remove excess solution. The treated fabric was then maintained at temperatures of 50 to 100° C. for periods between 10 and 30 minutes. After this treatment, the fabric was thoroughly rinsed, neutralized and scoured in a soap solution at 50° C.

A similar procedure was applied to a second nylon sample, however with the order of application of the treating liquids reversed.

In each case a high degree of wettabilty was obtained, with a greater durability of the wettable character for the first method.

Example 17

Since the "Standard Treating Solution" has a pH of 2.5, the effect of pH was tested by diluting it so as to yield a 2% solution of acrylic acid. The pH of this solution was buffered at 4.5 with sodium bicarbonate. A sample of nylon-66 woven fabric was treated to saturation with this solution at temperatures ranging from 50 to 100° C. for a period from 15 to 30 minutes. The material was then washed, neutralized, and washed with neutral soap at 50° C. The same procedure was repeated on other samples of nylon-66 woven fabric, except that the pH was brought to 6.5–7 with potassium hydroxide. All samples were subjected to the wettabilty test described above and proved to be superior to untreated controls. However, much better results were obtained at the lower pH's, i.e., those under about 4.5.

Example 18

Dyeing of nylon: Three dye baths were prepared—
Bath I contained:

|   | Percent |
|---|---|
| Standard Treating Solution | 2 |
| Acid dye Anthraquinone Blue SWF (C.I. 62055) | 0.1 |
| Water | 97.9 | the pH of the bath was about 2.5.
Bath II contained:

|   | Percent |
|---|---|
| Standard Treating Solution | 3 |
| Dispersed dye Brill. Blue FFS (C.I. 61505) | 0.1 |
| Water | 96.9 | this bath was buffered at 4.5 by sodium bicarbonate.
Bath III contained:

|   | Percent |
|---|---|
| Standard Treating Solution | 3 |
| Cationic dye Sevron Orange G (C.I. 48035) | 0.1 |
| Water | 96.9 | the pH of this bath was adjusted to 6.5 with sodium bicarbonate.

A sample of nylon-66 woven fabric was dyed in each bath, using the same procedure. All samples showed high degrees of wettability and excellent dye acceptance although there was some variation in the persistence of the wettability upon repeated washing.

Example 19

A 100% nylon-66 man's half-hose, weighing 15 g., was treated for 10 minutes at 40° C. in 5% (based on the weight of the goods) of standard monomer solution (part A of "Standard Treating Solution"). At the end of that time, 1 g. of an acid dyestuff (Pontacyl Black A2B, made by E. I. du Pont de Nemours), previously dissolved in water, was added to the bath. The temperature of the bath was allowed to increase to 90° C. and to remain there for 30 minutes during which time the dye in the bath was exhausted. Subsequently 1% of the Standard Sulfate Solution (part B of "Standard Treating Solution"), previously prepared, was added to the dye bath and the treatment continued for 20 minutes at 90° C. The article was then washed vigorously in water, neutralized with sodium bicarbonate and scoured in a 2% solution of a neutral soap for five minutes at 50° C. This was followed by rinsing and drying on a conventional half-hose form.

It was observed that the acid dyestuff became exhausted somewhat faster than is customary and that a full navy blue shade was obtained. Tests for wettability showed an instantaneous absorption of moisture from an eyedropper whereas conventionally dyed half-hose were completely unreceptive to the drop for nonreproducible lengths of time ranging from 30 minutes upwards.

Example 20

A sample of nylon-66 woven fabric, previously washed with caustic soda and solvent soap to remove soil, was soaked to saturation in a 5% aqueous solution of the "Standard Treating Solution" described before. The goods were treated for 20 minutes at 60° C., the temperature being then raised to 95° C. for another 20 minutes. The treated sample had a fair degree of wettability. The material was then treated by saturation with a 2% aqueous solution of the "Standard Treating Solution," for 50 minutes at 70° C. It was observed that the wettability of the nylon after treatment under these conditions was greatly improved. The temperature of the bath was then raised to the boiling point for another 20 minutes. Hand-washed samples subjected to this treatment showed excellent wettability. The goods were then washed and neutralized with sodium bicarbonate, evidencing excellent wettability. It was observed that a reduction in wettability attended the drying of the material at a temperature of 120° C. for 1 minute by a hand iron. Some of the lost wettability could be recovered by flexing the goods mechanically in water. In view of this phenomenon it is preferred to dry the sample at relatively low temperatures, i.e., below 120° C.

Example 21

Four samples of nylon-66 woven fabric (2.5 cm. by 7.5 cm.) were selected for the test. Two samples served as controls. All the samples were washed and dried. The two test samples were then treated with the "Standard Treating Solution" for 1 second and placed in an oven for 15 minutes at 70° C.

The tensile strength of all the samples was tested in a Dillon tester. The results are tabulated below:

|   | P.s.i. |
|---|---|
| (1) First control | 16,300 |
| (2) Second control | 16,100 |
| (3) First test sample | 18,400 |
| (4) Second test sample | 19,900 |

Example 22

*Preparation of Cerium Acrylate Suspension.*—Equal parts by volume of a saturated solution of ceric sulfate and glacial acrylic acid were gently heated to a temperature of about 60° C. There formed a yellow precipitate which was washed with water.

A 10-g. sample of nylon-66 woven fabric was immersed in a suspension of ceric acrylate, prepared containing about 1% by weight of said ceric acrylate. This suspension was maintained at a temperature of about 60° C. and the nylon sample was immersed in this bath for a period of about 10 to 15 minutes. The sample was then removed and hand dried with a hot iron. It exhibited good wettability when tested by the tests outlined herebefore; this wettability persisted after washing.

Example 23

An aqueous solution was prepared containing 2½% by volume of acrylic acid and 0.5% by volume of a saturated solution of $Ce(SO_4)_2 \cdot H_2SO_4$ (structural Formula 5 in solution), to which was added 1% by weight of sodium sulfate. A 10-g. sample of 100% nylon-66 fabric was treated in this solution for 20 minutes at 60° C. After ten washings at 50° C. in a 0.5% aqueous solution of "Ivory" soap, the nylon sample showed good wettability characteristics. The material was subjected to a conventional dyeing treatment employing an aqueous dye bath of the following composition:

1% of weight of goods of Anthraquinone Blue SWF;
2% of weight of goods of acetic acid.

The material was dyed for 20 minutes at 80° C. The dyed material was lighter than that obtained from the same fabric treated with a solution containing $$H_2[Ce(SO_4)_3]$$

and acrylic acid as described above.

Example 24

A 10-g. sample of polypropylene fabric, prepared from normally solid propylene homopolymer, was soaked to saturation in an aqueous solution containing 5% acrylic acid, 5% by volume of a saturated solution of technical ceric sulfate, containing 44% total sulfate expressed as $SO_3$, and 1% sodium sulfate. The material was subjected to treatment at 60°C. for 30 minutes and then dried with a hand iron. The same procedure was followed with a 10-g. sample "Dacron" fabric woven from a continuous filament of polyethylene terephthalate yarn (see Matthews' "Textile Fibers," sixth edition, pp. 1024–1032). Both samples had good wettability characteristics when measured by the tests previously described.

Example 25

The following example illustrates the use of an auxiliary reducing agent or initiator in conjunction with the metal compound. Three solutions were prepared having the following compositions:

Solution A:
    Acrylic acid (glacial), g. _____ 110
    Water, cc. _____ 190
Solution B:
    Technical ceric sulfate, 44% sulfate as $SO_3$
        (structural Formula 5 in solution), g. _____ 10.5
    Water, cc. _____ 300
Solution C:
    Sodium metabisulfite, g. _____ 50
    Water, g. _____ 950

100 g. of solution A, 20 g. of solution B and 20 g. of solution C were mixed and diluted with water to form a treating bath of 7,000 cc. This bath was buffered to a pH of 4 using sodium acetate. A 10-g. sample of nylon-66 fabric was immersed therein to saturation for 15 minutes at 60° C. and agitated vigorously. The fabric sample was removed and introduced into a 0.3% sodium bicarbonate solution at room temperature for 5 minutes. The fabric was then rinsed in cold water and dried over a hot drum (or in a dry box) at 80° C., whereupon the sample was tested for wettability characteristics using the tests previously described. The wettability proved to be very good, even after several washings.

Example 26

The procedure of Example 25 was repeated, except that sodium sulfite was used in place of sodium metabisulfite. The results obtained were substantially the same.

Example 27

A treating solution was prepared containing:

|   | Cc. |
|---|---|
| Acrylic acid (glacial) | 110 |
| Water | 190 |

Sodium metabisulfite, 1 part per 60 cc.

To this was added 300 cc. of an aqueous solution containing sodium bichromate to a concentration of 1% by weight. A sample of nylon-66 fabric was soaked to saturation therein at room temperature for about one hour and the excess liquid pressed out; the material was then dried with a hot iron. The resulting sample had excellent wettability and a soft hand. In place of the sodium bichromate mentioned above other chromium compounds were successfully employed. They included sodium chromate, potassium chromate and potassium bichromate. The amount of chromium compound employed could be varied from about 0.1% by weight up to about 20% by weight.

Example 28

Use of a textile-softening agent: A fresh treating solution was prepared containing—

| | |
|---|---|
| Acrylic acid (glacial) | 110 parts by weight. |
| Water | 190 parts by weight. |
| $Ce(SO_4)_2 \cdot H_2SO_4$ (structural Formula 5 in solution) | 1 part in 30 parts of $H_2O$. |
| Sodium metabisulfite | 1 part in 60 cc. of $H_2O$. |
| "Emersoft" 7700 Special (fatty-based derivative) as softening agent | 1 part in 60 cc. of $H_2O$. |

Immediately after preparation of this solution, a sample of woven nylon-66 fabric was immersed therein to saturation at a temperature of about 60° C. for 15 minutes. Excess liquid was pressed out and the sample washed with water prior to drying with a hot iron. The sample had good wettability characteristics and a soft hand. In place of the softening agent mentioned, the fatty amides as per U.S. Patent No. 2,764,601 were employed with equal success.

Example 29

5 cc. of glacial acrylic acid were poured over 1 g. of cupric sulfate and this, then, admixed with 500 cc. of water to form a treating bath. A 5-g. sample of "Creslan" acrylic fabric (polymer containing 88% acrylonitrile and 12% methyl vinyl pyridine) was immersed in the bath and 1 g. of sodium metabisulfite added. The temperature of the bath was raised from 30° C. to 80° C. and maintained there for 30 minutes. The fabric was removed from the bath, thoroughly washed and then dyed, using the conventional procedure in a bath containing 0.5 g. of Acid Red 113 (Du Pont) for 30 minutes at 80° C. An untreated control sample of the same fabric was simultaneously dyed with the test sample. The comparison showed that the pretreated sample picked up ten times as much dye as the untreated sample. Furthermore, the pretreated dyed sample had a fuller and rounder hand.

It has been found that for a given concentration of active materials the duration of the wettability of fabrics treated with the compositions of this invention, in particular nylons, can be prolonged by incorporating a polybasic acid compound in the treating composition. The quantity of polybasic acid compound employed with respect to the ethylenically unsaturated acid or other polymerizable monomer may vary considerably; in general, from 1 to 400 parts by weight of polybasic acid per 100 parts by weight of polymerizable monomer should be employed for best results.

Example 30

| | |
|---|---|
| Maleic anhydride, g. | 110 |
| Acrylic acid, g. | 110 |
| Water, cc. | 190 |
| Tergitol #4 (7-ethyl-2-methyl-4-undecanol sodium sulfate), cc. | 10 | are mixed until a clear first solution is obtained. Take:

| | |
|---|---|
| $Ce(SO_4)_2 \cdot H_2SO_4$ (structural Formula 5 in solution), g. | 10.5 |
| Nitric acid, cc. | 10 |
| Water, cc. | 300 | and mix until dissolved to form the second solution. The solutions are mixed and diluted with water at a ratio of 1:5.

A sample of nylon-66 fabric (Quality 1237), manufactured by Burlington Mills, weighing 10 g., is immersed in 200 cc. of the above solution heated to 95° C. and permitted to stand for 15 minutes. After washing and drying, the sample is subjected to a number of washings in a commercial washing machine, using plain soap ("Ivory" or "Lux"). The fabric shows excellent wettability after repeated washings as tested by the water-drop method (AATCC).

Example 31

The procedure was the same as in Example 30, except that succinic anhydride (300 g.) was used instead of maleic anhydride.

Example 32

The procedure was the same as in Example 30, except that adipic acid (300 g.) was used instead of maleic anhydride.

Example 33

The procedure was the same as in Example 30, except that 110 g. of adipic acid was used in place of maleic anhydride.

Example 34

The procedure was the same as in Example 30, except that no nitric acid was used.

Example 35

This example shows an alternative method for preparing a treating composition which is useful in accordance with the present invention and has certain advantages. It has been found that when the cerium catalyst is combined with water at a ratio of 1:4, a clear solution without a precipitate results. This solution is not disturbed by the addition of nitric acid.

10½ g. of $Ce(SO_4)_2 \cdot H_2SO_4$ (structural Formula 5) is dissolved in 42 cc. of hot water and stirred vigorously until the color of the solution becomes a medium brown; the solution is then allowed to rest until it becomes clear. 10 cc. of nitric acid is then added, although the composition can be used without nitric acid. This catalyst solution may be employed in conjunction with the acrylic acid/maleic anhydride solution of Example 30. In this case, the ceric solution of the present example is diluted with water at a ratio of 1:5 by volume and is mixed with the first solution of Example 30 after a like dilution thereof with water.

For comparison, samples of nylon-66 fabric were treated with aqueous solutions of the products cited in Examples 30 to 35 and washed in a washing machine three times using soap ("Ivory" or "Lux") and, after drying, a drop of water was placed on the stretched surface of each sample. The time required for the drop to disappear is given hereafter in Table III. The concentrations of the respective products used are expressed in this table in terms of the acrylic acid concentration or that of the mixture of acrylic acid and dibasic acid.

TABLE III

| Product: | Time for drop to disappear, minutes |
|---|---|
| Untreated nylon, no wettability. | |
| 16% acrylic acid | 7 |
| 5% acrylic acid | 11 |
| 2% acrylic acid | 28 |
| 1% acrylic acid | 28 |
| 16% acrylic acid+16% maleic anhydride | 3 |
| 5% acrylic acid+5% maleic anhydride | 3 |
| 2½% acrylic acid+2½ maleic anhydride | 3 |
| 10% acrylic acid+16% adipic acid | 5 |
| 5% acrylic acid+5% adipic acid | 6 |
| 2½% acrylic acid+2½% adipic acid | 2 |

The treating agents of the present invention are also advantageously employed in conjunction with various textile finish auxiliaries. Typical auxiliaries include salting agents, dye rate retarders, surfactants, lubricants, mordants, oxidizing agents, etc.

The following example illustrates a typical composition including textile finish auxiliaries. Parts indicate parts by weight.

Example 36

A two-part treating product is made as follows:

SOLUTION 1

| | |
|---|---|
| NaCl, parts | 20 |
| Na$_2$SO$_4$, parts | 20 |
| Polyethylene glycol (N.W. 200), parts | 10 |
| Sodium-2-ethylhexyl sulfate, parts | 2 |
| Sodium bichromate per 25 kg. of the mixture, gram | 1 |

All of the above are dissolved in 190 parts of water (50° C.). When the solution is clear, 110 parts of glacial acrylic acid are added.

SOLUTION 2

Dissolve 10.5 parts by weight of Ce(SO$_4$)$_2$·H$_2$SO$_4$ (structural Formula 5 in solution) in 300 parts of water.

To prepare the treating solution, 55 parts of Solution 2 is mixed with all of Solution 1 above. The treated nylon has enhanced dyeability when acid and dispersion dyes are used.

Example 37

A first solution was prepared containing:

| | |
|---|---|
| Maleic anhydride, grams | 100 |
| Acrylic acid, grams | 110 |
| Water, cc. | 190 |
| Tergitol anionic #4 (7-ethyl-2-methyl-4-undecanol sodium sulfate), grams | 10 |

A second solution was prepared containing:

| | |
|---|---|
| Sulfate-ceric acid H$_2$[Ce(SO$_4$)$_3$], grams | 10.5 |
| Water, cc. | 300 |

The two solutions are mixed and diluted with water in 1:5 ratio. When a sample of nylon-66 taffeta is placed in the above solution for 15 minutes at 95° C., graft polymerization takes place and the fabric exhibits a strong hydrophilic character which is not lost upon washing with soap in a commercial washing machine.

Example 38

The first solution is prepared as per Example 37 while the second is prepared from

| | |
|---|---|
| Lindsay ceric sulfate code 291 Ce(SO$_4$)$_2$·H$_2$SO$_4$ (structural Formula 5), grams | 10.5 |
| Water, cc. | 300 |

The solutions are mixed and diluted with water in 1:5 ratio. A sample of Creslan fabric consisting of 95% acrylonitrile and 5% methyl vinyl pyridine is treated with the above solution at 50° C. for 15 minutes. The resulting grafted product shows excellent dyeability with basic and disperse dyes. An untreated control accepts these dyes to a much lesser degree.

Example 39

The first solution is prepared as per Example 37 while the second is a 3% solution of sulfate ceric acid in water where it exists in the hydrolyzed form:

$$H[Ce(OH)(SO_4)_2]$$

The treatment of nylon 66 with this bath, in accordance with the procedure of Example 37, gives a strongly hydrophilic nylon fabric.

In all of the above examples, excellent wettability after repeated washings and enhanced dyeability especially with acid and disperse dyes was obtained.

In contrast, when chemically pure ceric sulfate (normal sulfate) was used as a catalyst, no improved dyeability whatsoever was obtained. Also when sulfuric acid was added to the normal ceric sulfate solution in a molar ratio, no increases in wettability or dyeability of nylon or polyester were obtained.

Example 40

Two solutions were prepared:

SOLUTION I

| | |
|---|---|
| Maleic anhydride, grams | 110 |
| Acrylic acid (glacial), grams | 110 |
| Tergitol #4 (sodium sulfate of 7-ethyl-2-methyl-4-undecanol), grams | 10 |

SOLUTION II

| | |
|---|---|
| H$_2$[Ce(SO$_4$)$_3$], grams | 10.5 |
| Water, cc. | 190 |

Solutions I and II are mixed together and diluted with 5 times by volume water to form a treating bath. Nylon-66 yarn was wound in a spool provided with a central bore. The spool was also provided with holes that passed from the outside into the central bore so that the treating solution could pass therethrough from the inside out. The nylon yarn and spool were introduced into the treating bath which was maintained at a temperature of 95° C. and kept there for 15 minutes. The resulting yarn exhibited strongly hydrophilic characteristics.

In an alternative procedure, the treating solution was introduced into the central bore of the spool under pressure. The solution is thus forced through the holes in the walls of the spool and then through the windings of nylon yarn.

Example 41

A 10-gram sample of nonreducing polyproylene woven fabric made from normally solid homopolymer of propylene was immersed for 15 minutes in the following solution maintained at 80° C.:

| | Grams |
|---|---|
| Maleic anhydride | 110 |
| Acrylic acid | 110 |
| Tergitol #4 (7-ethyl-2-methyl-4-undecanol sodium sulfate) | 10 |
| Ce(SO$_4$)$_2$·H$_2$SO$_4$ (structural Formula 5 in solution) | 10.5 |
| Water | 490 |

The sample of polypropylene was removed from said solution, washed with water and dried. This sample exhibited excellent wettability as evidenced by the immediate dispersion of a drop of water placed on the surface of the fabric. The sample was then washed in a commercial washing machine using a synthetic detergent and then dried. The wettability characteristics persisted as demonstrated by the disappearance within one minute of a drop of water placed on the surface of the fabric.

Example 42

The procedure of Example 41 was followed except that the solution described above was diluted with water in the ratio of 1:6 by weight. The product in this case also showed good wettability. After washing in a commercial washing machine using a synthetic detergent, some wettability was retained as evidenced by the disappearance of a drop of water placed on the fabric within 2 minutes.

Example 43

The procedure of Example 41 was followed except that polyethylene woven fabric was used in place of the polypropylene fabric. The results obtained were similar.

Surprisingly, it has been found to be important to utilize the polybasic acid compound and the polymerizable monomer in the treating solution in the ratio of about 3 to 1 by weight and that it is possible to do this without materially affecting the wetting characteristics of the treating agent. This is advantageous from an economic point of view since the polymerizable monomer is usually the more expensive material. Furthermore, it is possible to use high temperature with this composition, thereby improving the dyeing characteristics of the material treated.

Example 44

A first solution was prepared containing:

| | |
|---|---|
| Maleic anhydride, grams | 300 |
| $H_2O$, cc. | 300 |
| Acrylic acid, grams | 110 |
| Tergitol #4 (sodium sulfate of 7-ethyl-2-methyl-4-undecanol), grams | 10 |

A second solution was prepared containing:

| | |
|---|---|
| $Ce(SO_4)_2 \cdot H_2SO_4$ (structural Formula 5), grams | 10.5 |
| $H_2O$, cc. | 300 |

The two solutions were mixed together and diluted with water in the ratio of 1:6, 1:12, 1:24, and 1:120 by weight to give a 2%, 1%, .5%, and .1% solution respectively based on acrylic acid.

A respective sample of nylon-66 fabric (taffeta and tricot as representative woven and knitted fabrics were employed), was immersed in each above solution at temperatures from room temperature to the boiling point of the solution. In every case a water absorbent nylon was obtained, the wettability increasing with increasing acrylic acid concentration.

Example 45

A roll of 250 yards of 70 denier nylon-66 taffeta was mounted for treatment in a reversible jig of the type used in a dyeing plant. The treating solutions were ½%, 1% and 2% solutions of vinylic compound based on acrylic acid as described in Example 44 which contained about 3 times more maleic anhydride than acrylic acid by weight.

The procedure was as follows: the bath of the jig was filled with 35 gallons of water and brought to about a boil. The first solution of Example 44 was added to the bath after which the second solution, diluted 5:1 by weight with water, was added. For other concentrations of treating solution, the appropriate dilution was made. The resulting solution in the bath was kept at the boiling point and the roll of taffeta was continuously unwound from one roller of the jig, passed through the solution and rolled up on the other roller of the jig. The direction of rolling was then reversed. This was repeated until the material had been treated 8 times with the solution. At the conclusion of the run, the liquor was dumped and the taffeta was washed in overflow warm water in the jig. Sodium bicarbonate was added to the wash water and the roll of taffeta was run through the solution once. The taffeta was then rinsed in clear cold water. The pH of the taffeta was about 7.

The materials treated in accordance with these procedures exhibited increased ability to pick up dyes in a subsequent dyeing operation. Material treated with the 2% arcylic acid solution showed 500% increased dyeability while material treated wtih the .5% acrylic acid solution showed a 100% increase in dye pick up with cationic (basic) dyestuffs. With disperse dyestuffs, the material treated with the 2% solution showed 200% increased dye pick up while material treated with the .5% solution showed 50% increase in dye pick up. The quality of the dyeing in all instances was excellent.

Example 46

Five hundred pounds of nylon-66 "tricot" fabric in the greige was wrapped around a perforated hollow cylinder provided at its ends with an inlet and outlet tube. This was mounted in a treating tank having inlet and outlet tubes corresponding to the inlet and outlet tubes of the perforated cylinder. The tank was filled with water to a level of about 3 inches above the level of the fabric and the water was brought to a temperature of about 200° F. A scour solution having the following composition was added:

| | Lbs. |
|---|---|
| Versene (disodium salt of ethylenediaminetetraacetic acid | 5 |
| Tergitol NPX (nonylphenyl polyethylene glycol ester having 10.5 moles of ethylene oxide per mole of ester | 5 |
| Sodium carbonate | 20 |
| Solvent scour emulsion (a mixture of naphta solvent, soap and water | 20 |

The fabric was scoured for 20 minutes in this solution.

After scouring, water was introduced into the tank so that liquid flowed over the top. The volume of liquid in the tank was then reduced so that it was at a level about 1 inch above the fabric wound on the perforated cylinder. The tank now contained about 750 gallons or approximately 6,000 lbs. of liquor with a substantial part of the scour solution remaining.

A treating solution, having the following composition, was prepared and added to the liquor in the tank:

| | |
|---|---|
| Acrylic acid, lbs. | 30 |
| Maleic anhydride, lbs. | 30 |
| Water, lbs. | 60 |
| Tergitol #4 (7-ethyl-2-methyl-4-undecanol sodium sulfate, qt. | 1 |

A second solution, with the following composition, was also prepared and added to the liquor:

| | Lbs. |
|---|---|
| Cerium sulfate $Ce(SO_4)_2 \cdot H_2SO_4$ (structural Formula 5 in solution) | 3 |
| Water | 12 |
| Nitric acid | 3 |

The fabric was then treated in the tank for 30 minutes at temperatures in the range of between 180° F. to 200° F. At the conclusion of the treatment the pH of the liquor was adjusted to between 4.5 and 6.5 using sodium carbonate. Dyeing of the fabric was accomplished in the tank liquor by adding to it the acid dyestuff set out below to yield a pale blue tint.

DYE COMPOSITION

| | |
|---|---|
| Dupont Blue 5R (C.I. 26360), lbs. | 6 |
| Pontacyl Yellow 6x (C.I. 18965), ozs. | 19 |
| Neutral Green GN (C.I. 61570), ozs. | 8 |
| Versene (disodium salt of ethylenediaminetetraacetic acid), lbs. | 4 |

Sampling was done at 30 minute intervals and dyeing was completed within 1 hour. A small quantity of acetic acid was added after the first sampling. Dyeing was effected at temperatures in the range of about 160° F. to 180° F. The dye bath was discarded and the fabric was rinsed, framed and finished in the usual manner. At the conclusion of the dyeing the wettability tests as described above showed an instantaneous wetting of the fabric and dispersion of the water on the nylon "tricot."

Example 47

Samples of nylon-66 taffeta fabric were treated with solutions containing the equivalent of 0.0%, 0.5%, 1.0%, 1.5% and 2.0% acrylic acid for identical periods, the solutions and treatment being similar to that described in Example 49 infra. Wettability tests were made by observing the length of time (Wicking Time) required for a drop of water of constant size to wick completely into the fabric. Additionally, the standard A.S.T.M. wicking test was employed to determine the Wicking Height of each sample. The following results were obtained:

TABLE IV

| | Percent Modification | | | | |
|---|---|---|---|---|---|
| | None (0.0%) | 0.5% | 1.0% | 1.5% | 2.0% |
| Wicking time (seconds) | 262 | 115 | 110 | 176 | 62 |
| Wicking height (inches): | | | | | |
| Warp— | | | | | |
| 1 min | 0.00 | -------- | .38 | -------- | .80 |
| 5 min | .03 | -------- | .55 | -------- | 1.20 |
| 1 hr | .18 | -------- | 1.05 | -------- | 1.65 |
| 3 hr | .28 | -------- | 1.15 | -------- | 1.83 |
| 6 hr | .38 | -------- | 1.15 | -------- | 1.83 |
| Filling— | | | | | |
| 1 min | .05 | -------- | .20 | -------- | .80 |
| 5 min | .05 | -------- | .33 | -------- | 1.15 |
| 1 hr | .20 | -------- | .60 | -------- | 2.05 |
| 3 hr | .23 | -------- | .65 | -------- | 2.05 |
| 6 hr | .38 | -------- | .70 | -------- | 2.15 |

There was a gradual increase in the degree of wettability with added treatment with the exception of the 1.5% treatment, although this value could have been an anomaly. In all cases, however, wettability was substantially improved and the samples evidenced high wicking characteristics, especially at higher degrees of modification. Use of cationic dyes showed a significant increase in dyeing rate with increasing modification of the fabric.

*Example 48*

Nylon-66 tricot and taffeta fabrics were treated with the standard solution to obtain a 2% modification of the samples. The taffeta fabric was treated in such a way that a sample could be removed midway through the treatment. The two taffeta samples thus obtained are identified as Taffeta 1% and Taffeta 2%, respectively. The following results were obtained:

TABLE V

| | Number of Washes after Treatment | | | | | | Untreated |
|---|---|---|---|---|---|---|---|
| | 0 | 1 | 2 | 3 | 4 | 5 | |
| Wicking Time in Seconds: | | | | | | | |
| Taffeta 1% | 88 | 133 | 138 | 120 | 101 | 93 | 430 |
| Taffeta 2% | 67 | 112 | 103 | 94 | 95 | 65 | 430 |
| Tricot | 93 | 6-8 | 2-4 | 4-8 | 4-8 | 4-8 | >300 |

Surprisingly, the wettability of tricot fabric increased markedly with washing, whereas the taffeta fabrics evidenced a temporary loss of wettability upon washing, but rapidly regained the original degree of wettability. Even when some loss of wettability was exhibited, all of the treated samples were far more wettable than the untreated control sample. Substantial improvements in antistatic behavior were also noted for the treated samples.

*Example 49*

A monomer solution was prepared by admixing:

| | |
|---|---|
| Acrylic acid, g. | 40 |
| Maleic anhydride, g. | 40 |
| Hydrogen peroxide, g. | 1 |
| Water, cc. | 1,000 |

A catalyst solution was prepared by dissolving 0.5 g. of ferrous ammonium sulfate and 3 g. of glacial acetic acid in 500 cc. of water. A sample of nylon-66 woven fabric was dipped initially in the catalyst solution and permitted to remain therein for 15 minutes. After squeezing to remove excess, the sample was immersed in the monomer solution for a period of 15 minutes, the first treatment taking place at room temperature (about 25° C.) while the second was carried out at a temperature close to the boiling point. The fabric was then washed and dried. Similar treatments were carried out with manganous sulfate and cuprous chloride substituted for the ferrous ammonium sulfate as the requisite reducing agents. All of the samples were washed five times in a commercial machine with a conventional detergent, dried and subjected to standard drop-disappearance tests (ASA No. L.14.75–1956 or AATCC 39–1962). A similar test was carried out with a solution omitting one of these reducing agents, the following results being obtained:

TABLE VI

| Sample No. | Reducing Agent | Wettability after Five Repeated Washings |
|---|---|---|
| 1 | (None) | 12–15 min., 33 sec. |
| 2 | Ferrous Ammonium Sulfate | 4 min., 50 sec.–5 min., 40 sec. |
| 3 | Manganous Sulfate | 5 min.–5 min., 28 sec. |
| 4 | Cuprous Chloride | 6 min.–6 min., 24 sec. |

In each case the resulting fabric had a high degree of wettability when compared with the control and with an untreated fabric which was totally incapable of absorbing the test drop.

*Example 50*

A monomer solution was prepared by admixing:

| | |
|---|---|
| Water, cc. | 300 |
| Acrylic acid (glacial), g. | 6 |
| Maleic anhydride, g. | 6 | this solution then being added to a catalyst or activator solution composed of:

| | |
|---|---|
| Ceric oxide, g. | 3 |
| Concentrated nitric acid, g. | 3 | dissolved in:

| | |
|---|---|
| Water, cc. | 300 |

The admixture was heated to boiling and a sample of nylon-66 woven fabric immersed therein for 15 minutes. The sample was then washed in water and dried; the dried fabric exhibited a high degree of wettability in comparison to an untreated control swatch of the same fabric when tested as in Example 49.

When rare-earth or actinium compounds were substituted for the ceric oxide improved wettability was observed as shown in the following table. It should be noted that praseodymium oxide and terbium oxide produced slight discoloration of the samples. Results are given for drop-disappearance test.

TABLE VII

| Sample No. | Rare Earth | Wettability after Five Washes |
|---|---|---|
| 1 | (None) | 12–15 min., 33 sec. |
| 2 | Dysprosium Oxide | 5 min., 54 sec.–6 min. 20 sec. |
| 3 | Erbium Oxide | 7 min.–7 min., 54 sec. |
| 4 | Europium Oxide | 9 min., 5 sec.–11 min., 34 sec. |
| 5 | Gadolinium Oxide | 8 min., 50 sec.–9 min., 4 sec. |
| 6 | Holmium Oxide | 4 min., 28 sec.–7 min., 19 sec. |
| 7 | Lanthanum Oxide | 5 min., 16 sec.–8 min., 40 sec. |
| 8 | Neodymium Oxide | 5 min., 36 sec.–7 min., 25 sec. |
| 9 | Praseodymium Oxide | 4 min., 50 sec.–5 min., 2 sec. |
| 10 | Samarium Oxide | 7 min., 48 sec.–8 min., 42 sec. |
| 11 | Terbium Oxide | 3 min., 20 sec.–4 min., 1 sec. |
| 12 | Thorium Oxide | 8 min., 20 sec.–10 min., 32 sec. |

The amount of moisture regain at 65% relative humidity of fabrics treated as above appears to decrease with increasing concentration of monomer and metal oxide in the treating solution, no impairment of wettability being evident. This consequence is of importance since it permits rapid dissipation of absorbed moisture (perspiration) by evaporation. The treated fabric is thus particularly suitable for use in garments.

I claim:

1. A composition of matter useful in rendering hydrophobic polymeric materials wettable, comprising an aqueous solution at a pH less than about 3 of acrylic acid and maleic anhydride in which has been incorporated $$Ce(SO_4)_2 \cdot H_2SO_4$$

2. A process for dyeing nylon polyamides while rendering them wettable with a high degree of residual wettability after repeated washing, comprising the steps of treating the polyamide with an aqueous solution of between substantially 0.5 and 40% by weight of acrylic acid and between 0.5 and 40% by weight of maleic anhydride in the presence of 0.01 to 5% by weight of a ceric compounds having the structural formula $$H_2[Ce(SO_4)_3]$$

in solution, based on the weight of said solution, at a pH below substantially 3 for a period between substantially 1 and 60 minutes until between substantially 0.1 and 2.5%, by weight of the polyamide, of acrylic acid is graft polymerized thereon; admixing a dye with said solution; and washing the polyamide so treated.

References Cited by the Examiner

UNITED STATES PATENTS

| | | | |
|---|---|---|---|
| 2,922,768 | 1/1960 | Mino et al. | 260—857 |
| 3,099,631 | 7/1963 | Tanner | 260—857 |

FOREIGN PATENTS 628,835  10/1961  Canada.

OTHER REFERENCES

S. Venkatakrishan et al.: Die Makro. mol. Chemie 27, 51–60 (1957).

Sadlick, J. Polymer Sci. 19, 73–75 (1956).

Hardwick et al.: Canadian J. Chemistry, 29, 828 (1951).

Harwood, The Effects of Radiation on Materials, Reinhold Publishing Corp., N.Y. (1958), p. 287.

MURRAY TILLMAN, *Primary Examiner.*

P. LIEBERMAN, *Assistant Examiner.*